(No Model.)
C. S. APPLE.
POTATO MASHER.
No. 472,515. Patented Apr. 12, 1892.
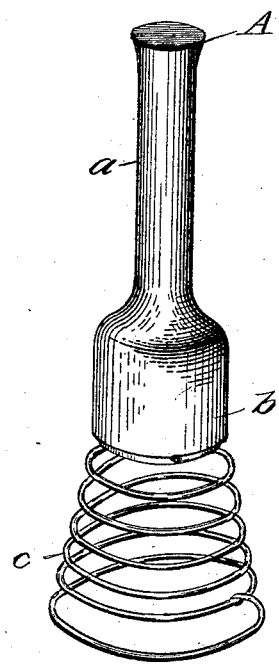
WITNESSES.
A. A. Erb
Arthur C. Clarke.
INVENTOR.
Charles Spicer Apple
by Francis L. Dyers
Attorney

UNITED STATES PATENT OFFICE.

CHARLES SPICER APPLE, OF BELLAIRE, OHIO.

POTATO-MASHER.

SPECIFICATION forming part of Letters Patent No. 472,515, dated April 12, 1892.

Application filed July 29, 1891. Serial No. 401,032. (No model.)

*To all whom it may concern:*

Be it known that I, CHARLES SPICER APPLE, a citizen of the United States, residing at Bellaire, in the county of Belmont and State of Ohio, have invented certain new and useful Improvements in Potato-Mashers; and I do hereby declare the following to be a full, clear, and exact description of the invention, which will enable others skilled in the art to which it appertains to make and use the same.

In mashing potatoes it has been customary to first make use of a wooden masher and to then beat or lighten them with a fork or spoon. It therefore takes considerable time and a good deal of labor at present to properly prepare mashed potatoes.

My present invention relates to an improved article of manufacture, consisting of a combined potato masher and beater, whereby the two operations necessary to prepare mashed potatoes may be performed at one and the same time.

The principal object of the invention is to provide a very simple and inexpensive article of manufacture which will perform these two operations effectively and quickly.

For a better comprehension of the invention attention is directed to the accompanying drawing, forming a part of this specification, in which the figure shows a perspective view of the improved device.

A is a wooden potato-masher of the general form shown, with a handle $a$ and with an enlarged head or body portion $b$. Secured to the lower end of the enlarged head $b$ is a wire $c$, bent in the form of a hollow cone or spiral, as shown, with the lower portion forming a circle. The extreme end of the wire is bent round upon itself, as shown, so as to retain its form. This wire has a good deal of elasticity, so that it may be compressed and will regain its form when released. Instead of wire, it will be evident that other elastic materials may be used—such as rattan, rubber, celluloid, or other substances—and it will be evident that the potato-masher may be made of other materials than wood.

The device is to be used precisely like the ordinary potato-masher.

When in use, the lower end of the enlarged head $b$ will mash the potatoes in the usual way and the elastic wire $c$ will be compressed and expanded according to the movements of the article. This elastic wire in thus moving through the substance will effectively beat and lighten the potatoes, which will be accomplished at the same time that the potatoes are being mashed.

Having now described my invention, what I claim as new therein, and desire to secure by Letters Patent of the United States, is as follows:

1. An improved article of manufacture, consisting of a potato-masher having an enlarged head, and with a beater at its lower end, consisting of an elastic wire bent in the form of a spiral.

2. An improved article of manufacture, consisting of a potato-masher A, having a handle $a$, an enlarged mashing portion $b$, and with a beater $c$ at its lower end, consisting of an elastic wire bent into the form of a spiral.

CHARLES SPICER APPLE.

Witnesses:
JOHN CROZIER,
T. S. RICKERTON.